Figure 1:
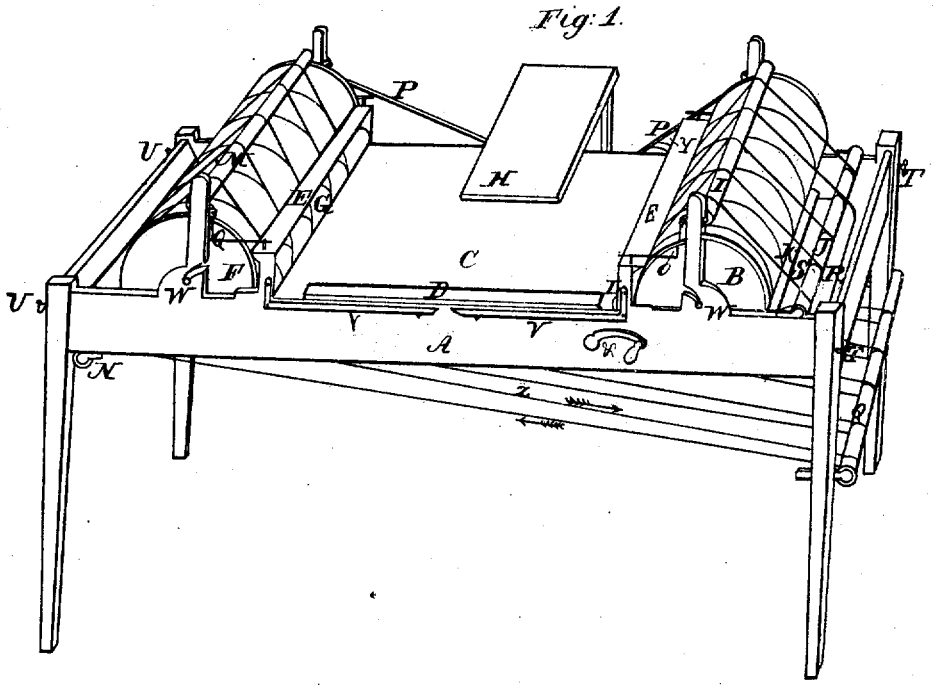
Figure 2:
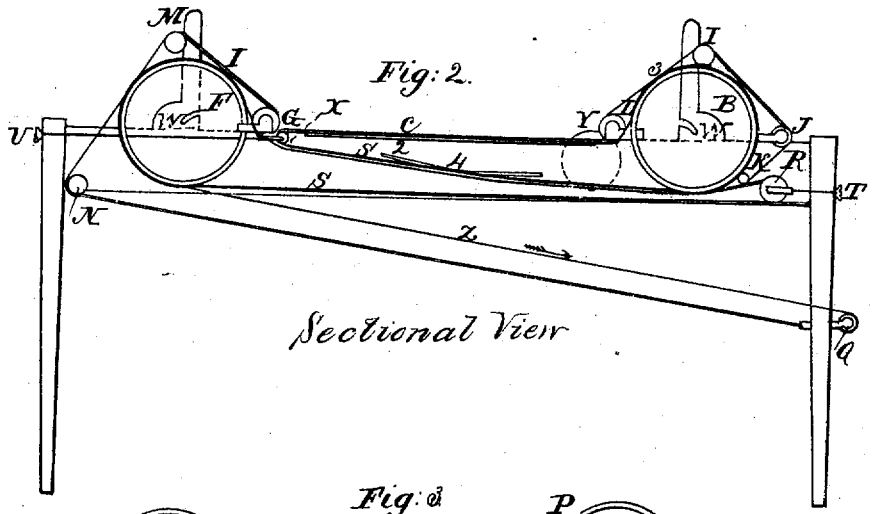
Figure 3:
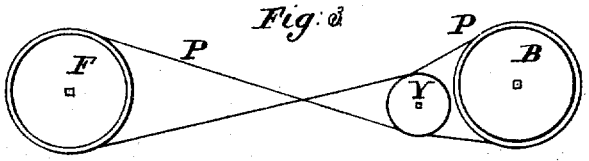
Figure 4:
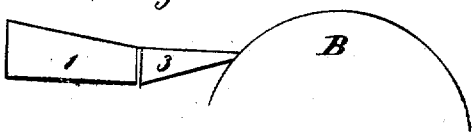

8901X

J.C. Teasdale.
Ruling Mach.

No. Patented Jun. 15. 1835.

Sectional View

James C. Teasdale, Danville New York

Letters Patent.

The schedule referred to in these Letters Patent and and making part of the same, containing a description in the words of the said James C. Teasdale himself of his improvements in a machine for ruling paper called Teasdales Ruling Machine.

Be it known that I, James C. Teasdale, of Dansville, Livingstone County State of New York, have made an improvement in the useful arts, being a machine for ruling paper called "Teasdales Ruling machine" which is described as follows. This machine consists of the following principal parts. The frame for supporting the machinery: two cylinders upon which the ruling is performed; two aprons for carrying the paper. rollers ~~for~~ guiding and carrying the strings, the plane upon which the paper is laid two pen stands- springs for pressing the pens against the cylinder. crank, pulleys & bands, by which the machine is worked. The frame is about 6 feet long. 2 ft. 4 in wide, the side rails are 6 inches wide, 1½ inch thick. There are two heads about 1 ft. 6 inches higher than the plane of the frame, for carrying the cylinders & rolls upon which they run. The cylinders are about 1 foot diameter, & in length nearly equal to the width of the frame. they are constructed by making two heads upon which are nailed laths or light pieces of wood so as to form a true, light, hollow cylinder. They turn on gudgeons on the heads, and are covered by the aprons. The rollers for guiding and carrying the strings- There are two lower rollers, one for each cylinder, about 3 inches diameter, supported and turning on slides. There are grooves in them for receiving the cords and preventing them from marking the paper. These rollers are for receiving the paper

8901X paper to be ruled. There is also an upper roller for each cylinder grooved in like manner, for receiving and guiding the cords. All these rollers turn on bearings in the frame. There are also two rollers for each cylinder for tightening the cords. these run in slides. The plane upon which the paper is laid is supported on the frame, and extends from one cylinder to the other. The apron passes over this plane and the paper is laid upon the apron. There is a pen stand for each cylinder. upon which the pens are placed, and is joined to the frame by hinges that it may be thrown back from the cylinder at pleasure, and has a circular brace from the upright pieces into the pieces upon which the pens are placed to elevate or depress the points of the pen. The springs for pressing the pens against the paper. There is a spring placed at each end of the pen stands, which bear the pens against the paper. The machine is worked by a crank on one end of an axle passing through the frame, having a pulley with a double groove in it at the other end - on one end of each cylinder is a pulley, having a groove in it to receive a band which crosses & passes round each of the pulleys, and by which the machine is worked.

Operation. The paper to be ruled is laid on a stand attached to the back part of the frame, between the cylinders & there laid upon the apron against a guide. The pens being set in the pen stands according to the required pattern, and filled with ink - The crank is then turned, the paper is carried forward to the right hand cylinder, it then passes under the lower roller, with the cords, and is carried to the cylinder, where it is ruled by the pens. the springs pressing them against it; it is then carried over this cylinder and enters between two aprons, & is held between them till it reaches the left hand cylinder; it is then taken

890 taken up over this cylinder by a another set of strings & is ruled on the other side by another set of pens. it then passes round the cylinder & is carried off to the right hand of the machine & falls into a box. The invention here claimed and desired to be secured by Letters Patent, consists in having an additional cylinder, apron & strings by which the paper is ruled on both sides. as before described. For a further illustration of my inven=tion I refer to the model and drawing of the same deposited in the Patent office.

Witnesses
Clement T. Coote
J. Alfred Elliot

James C. Teasdale

Exd
Ck 792 wds (Drawing)

(Patented 15 June 1835)